April 30, 1935.  C. C. MORLEY  1,999,340
POWER TRANSMISSION MECHANISM
Filed Dec. 29, 1933   2 Sheets—Sheet 1

INVENTOR:
Cecil Charles Morley
By [signature] Attorney

April 30, 1935. C. C. MORLEY 1,999,340
POWER TRANSMISSION MECHANISM
Filed Dec. 29, 1933 2 Sheets-Sheet 2
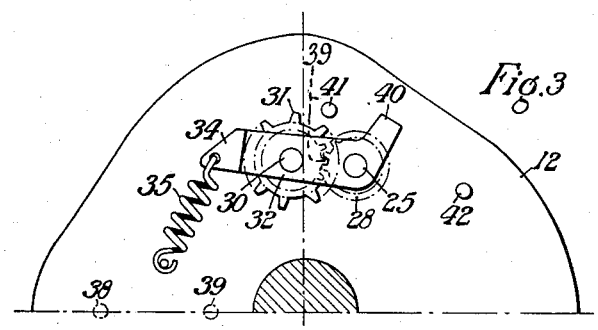
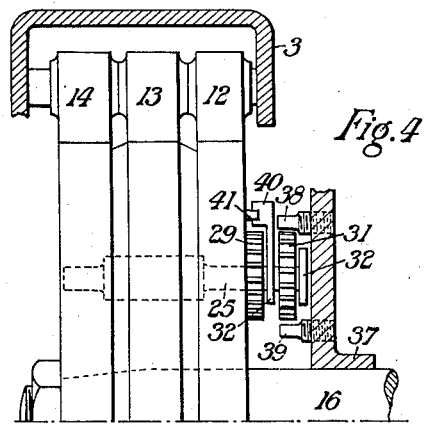
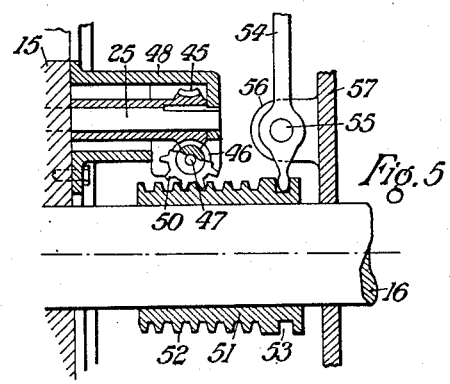
INVENTOR:
Cecil Charles Morley
By [signature], Attorney Patented Apr. 30, 1935

1,999,340

UNITED STATES PATENT OFFICE 1,999,340

POWER TRANSMISSION MECHANISM

Cecil Charles Morley, Salisbury, England

Application December 29, 1933, Serial No. 704,579
In Great Britain June 22, 1933

4 Claims. (Cl. 192—55)

This invention relates to power transmission mechanisms and has for its chief object the provision of a simple and efficient form of power transmission mechanism adapted to permit the torque obtainable from or delivered to a driven shaft to be varied between predetermined limits.

A further object of the invention is to provide an efficient form of power transmission mechanism by which a considerable range of torque variations may be obtained such as will permit a prime mover, designed to carry a normal load, also at least temporarily to cope with an abnormal load.

Another object of the invention is to provide an improved form of power transmission mechanism adapted to permit a variable torque to be obtained from a source of substantially constant torque.

According to the invention a power transmission mechanism or unit is provided comprising the combination of a driving member, a driven member, a plurality of cams carried by or coupled to one of the members, a plurality of loaded elements carried by or moving with the other member so as to coact with the cams in affording a driving connection between the driving and driven members, and means or facilities for enabling the maximum torque setting of the mechanism to be varied between predetermined limits.

Preferably, a kinetic energy storing member is associated with the aforesaid driving member. The mechanism is, however, reversible since the aforesaid driven member may constitute the driving member, a similar effect being thereby produced by the cam members acting upon the loaded arms, there preferably being, under these conditions, a kinetic energy storing member associated with the driving member (i. e. the aforesaid driven member).

In order to simplify the description of the invention the member carrying the cam member or members will be hereinafter referred to as the "driven member" and the member carrying the coacting elements or loaded arms will be hereinafter referred to as the "driving member", although, as mentioned above, the functions of these members may be reversed. If desired, means may be provided for enabling the cam members to be displaced relatively to one another for the purpose of enabling the maximum torque setting to be varied.

In order that the said invention may be clearly understood and readily carried into effect, the same will now be more fully described with reference to the accompanying drawings which illustrate, by way of example, one convenient mode of carrying the invention into effect and in which:—

Figs. 3 and 4 are detail views of one convenient speed responsive means which may be employed for the relative displacement of the cam members; and Fig. 5 is a detail view of a manually operable means which may be employed for such relative displacements.

Figure 2:
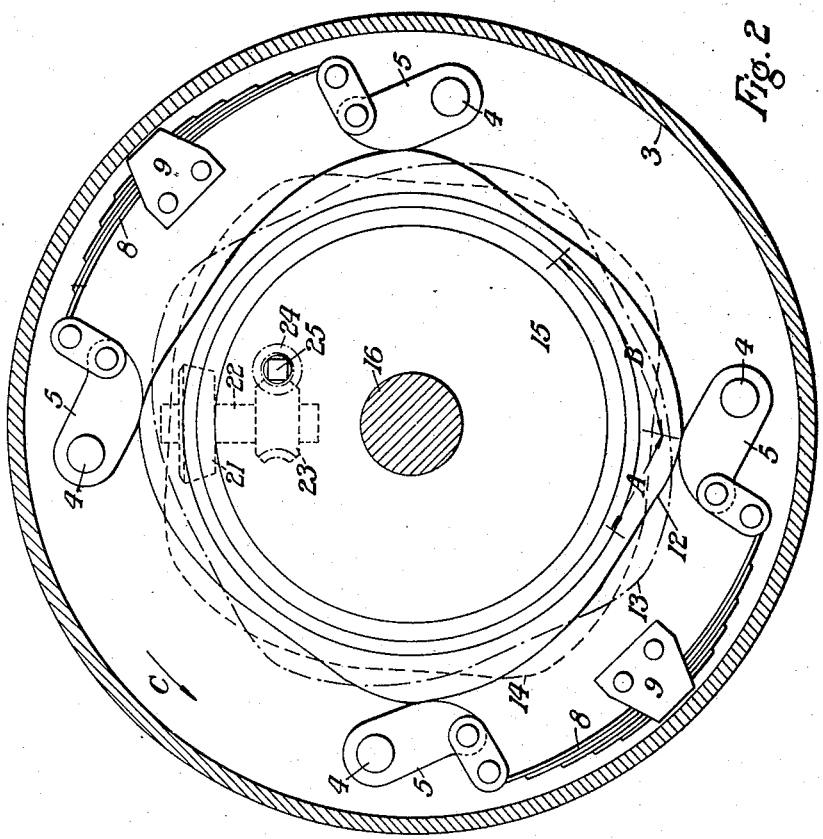
Fig. 2 is a side view taken on the line 2—2 of Fig. 1, illustrating the formation and the disposition of the cam members and their co-acting elements.
Figure 1:
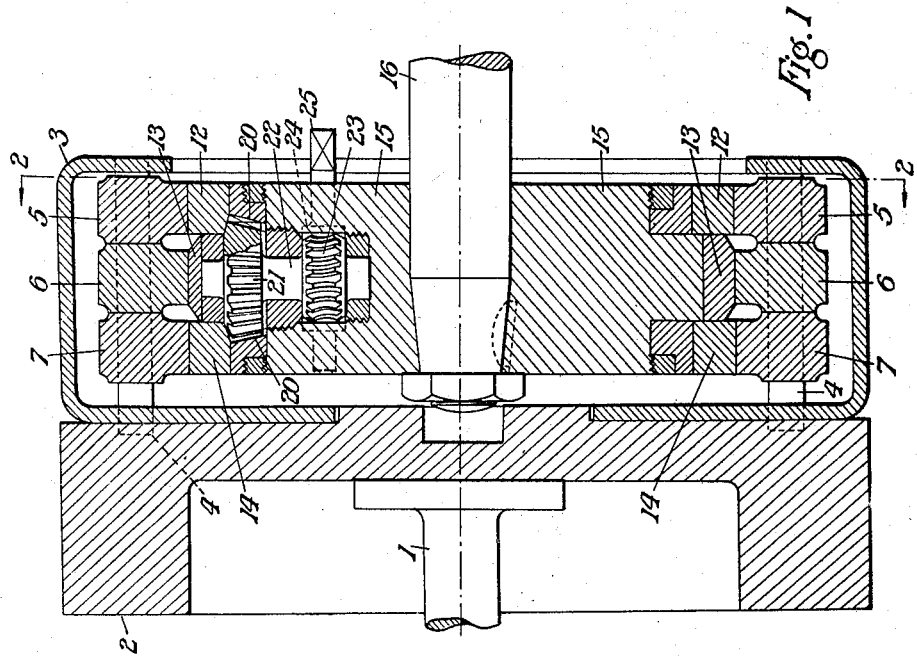
Figure 1 is a vertical sectional view through a power transmission unit embodying three of the aforesaid cam members.

Referring now to the accompanying drawings in detail, 1 denotes a driving shaft which is connected to a suitable source of power (not shown) and to the end of which is connected to move therewith a flywheel 2. To the latter is secured a housing 3 carrying four angularly spaced pivot pins 4 arranged with their axes parallel with the axis of rotation of the shaft 1 and with their centres at equal radial distances from the centre of rotation. Upon each of the pivot pins 4, are pivotally mounted three arms 5, 6 and 7, which are suitably loaded or urged towards the axis of rotation of the shaft 1, as for example, by leaf springs 8 anchored at their middle portions by brackets 9 to the housing 3. The aforesaid arms are so arranged that each of the sets of angularly spaced arms is adapted to coact with one of a plurality of cam members carried by the shaft to be driven. That is to say, in the arrangement illustrated, there are three cams 12, 13 and 14 mounted on a central hub 15 which is keyed to a driven shaft indicated at 16, the arrangement being such that the four arms 5 are disposed in the same plane as, and are adapted to coact with, the cam 12, whilst the arms 6 are disposed in the same plane as, and are adapted to coact with, the cam 13, and the arms 7 are disposed in the plane of, and adapted to coact with, the cam 14. It is to be understood, however, that the invention is not restricted to the employment of any particular number of cams or arms and that the numbers of such elements employed in any particular transmission mechanism will be dependent upon the characteristics of the plant or machinery to which the mechanism is to be applied and the nature of the torque variations required or the speed fluctuations permissible.

As regards the contours of the cams, it will be observed that each comprises four substantially equal portions of corresponding outline or configuration providing four raised parts or humps the opposite inclined sides of which are unsymmetrical. That is to say, each hump or raised portion of each of the cams is made up of an inclined portion A forming one side of the hump and a less steeply inclined portion B forming the other side of the hump. In operation, the driving shaft and the housing 3 are rotated in the direction of the arrow C shown in Fig. 2 so that the driving torque tends to urge the spring loaded arms 5, 6 and 7 forwardly and up the steeper inclined surfaces A provided on the cam surfaces. The design on the cam members is such that, when the arms are turned about their pivots in opposition to the springs and are caused to move up the more steeply inclined surfaces A, a reaction is provided on the cam members tending to drive the shaft to be driven in the same direction as the driving shaft. On the other hand, while the spring loaded arms are being drawn over the less steeply inclined surfaces B, substantially no reaction is produced tending to drive the driven shaft 16, the slope of the cam surfaces B being such that the reaction due to the load and friction passes approximately through the centre of rotation.

The cam members 12, 13 and 14 are preferably mounted upon the central hub 15 so that they are capable of being moved angularly relatively to each other and, in instances where the driven shaft is required to deliver, or to be capable of delivering, a large or its maximum torque, the cams are set as shown by the full line in Fig. 2 or, in other words, they are set so that the outlines of the cams 13 and 14 coincide with the outline of the cam 12. The loading provided on each set of the spring loaded arms is preferably such that the torque required to move each set of arms over the steeper inclined cam portions A is substantially equal to the torque available from the driving shaft 1 which together with its associated flywheel 2 are so constructed and designed that the energy stored is sufficient for the operation of the transmission unit within the limits of speed fluctuation permissible. When the load on the driven shaft is such that the torque required is in excess of the normal torque delivered by the driving shaft, the additional energy needed to move the spring loaded arms up and over the steeper portions of the cams is derived from the flywheel 2, it being understood that the arms having been driven to the tops of the cams require no further energy to move them over the cam portions B since the slope of these portions in relation to the path of the arms corresponds substantially with the angle of friction. In the particular arrangement herein described, the length of each of the cam portions B is made twice the length of each of the cam portions A so that, in moving the three sets of spring loaded arms 5, 6 and 7 through a complete cycle, with the cams in the position now being particularly described, the average energy drawn from the driving shaft corresponds with that available at the driving shaft at its normal torque, whilst the torque supplied to or available at the driven shaft, when the arms are acting upon the cam portions A, exceeds and is in the neighbourhood of three times that normally available at the driving shaft.

In instances in which a lower maximum torque setting is permissible or desired, the cam members 12, 13 and 14 are displaced in relation to one another, the limiting position being that in which the cams occupy the relative positions shown by the full lines, the dotted lines and the chain-dotted lines shown in Fig. 2. The degree of displacement will, of course, be dependent upon the torque required and, in the limiting position above referred to with the cam 13 occupying the chain-dotted line position, the cam 14 occupying the dotted line position and the cam 12 occupying the full line position, there will be little relative movement between the cam members and their coacting spring pressed arms. With the cams disposed in these relative positions, only one set of spring pressed arms contacts with the steeply inclined cam portions A at any one time. Also, by virtue of the fact that the cam members are so formed that the lengths of the cam portions A are substantially one-third of the lengths of the individual cam sections composed of the cam portions A and B, or one-twelfth of the cam periphery, and by virtue of the fact that the crests of the three cams are angularly displaced from one another by substantially 30°, one set of spring-loaded arms will arrive at the bottoms of the corresponding cam portions A as soon as the preceding set of arms has reached the tops of cam portions A with which they co-operate.

Under these conditions of operation, the torque imparted to the driven shaft 16 will nearly correspond with the torque applied by the driving shaft 1.

From the foregoing description it will be appreciated that, when the load on the driven shaft 16 is light, the driving member and the driven member will rotate at substantially the same speed or under conditions providing substantially a direct drive with little or no relative movement between the cam members and their coacting spring pressed arms. On the other hand, when the load increases, there will be relative movement between the cams and the spring pressed arms with the result that the driven shaft will rotate at a slower speed than that of the driving shaft. Under these conditions, the spring pressed arms will impart a succession of forwardly directed impulses to the cam members and the torque applied to or available at the driven shaft will be increased, the magnitude of the impulses and the amount by which the torque is increased being dependent upon the settings of the cam members.

As mentioned previously, the unit is reversible, i. e. either shaft 1 or the shaft 16 may be "driven", providing that the direction of rotation to produce an increase of torque is such that the relative motion between the cam members and the arms causes the latter to move up the steeper cam portions A and that a momentum or kinetic energy storing element is associated with the "driving member".

In order to provide for the relative displacements of the cam members, bevel teeth 20 are provided on the inner side faces of the cams 12 and 14 so that they are adapted to engage with a pinion 21 mounted in the central hub 15 with its axis of rotation disposed radially of the hub, whilst the cam 13 is rigidly secured to a peripheral portion of the hub. Adjacent to its inner end, the pinion shaft 22 is provided with a worm wheel 23 adapted to co-operate with a worm 24 provided upon a spindle 25 rotatably mounted in the hub 15 with its axis of rotation disposed parallel with the driven shaft 16. By rotating the spindle 25, the cams 12 and 14 can be displaced relatively to the cam 13 by predetermined amounts dependent upon the maximum torque setting required. In instances where it is required to provide a transmission unit for greater torque ratios, the lengths of the cam portions A are decreased and the lengths of the cam portions B are increased so that the ratio of the sum of the lengths of the cam portions A and B to the lengths of the portions A corresponds substantially with the ratio of the torque required and the number of sets of cams to be provided for the operation of the unit. With these conditions the mean torque supplied to the cams will correspond with the normal torque available at the driving shaft.

In some instances, means responsive to the speed fluctuations of the driven shaft may be provided for automatically adjusting the maximum torque settings of the cams under the varying load conditions. One convenient means suitable for this purpose is diagrammatically illustrated in Figs. 3 and 4. To the outer end of the spindle 25 is secured a gear wheel 28 adapted to mesh with another gear wheel 29 keyed to a spindle 30 on which is also keyed a further toothed wheel 31. The spindle 30 is rotatably mounted in a pair of parallel arms 32 which are pivotally mounted on the worm spindle 25 and with free ends of which are associated a weight 34 and a spring 35, the latter being so arranged that it tends to move the weight and the arms inwardly and being so proportioned that, as the speed of the driven shaft 16 varies, the arms 32 will be moved upon their pivotal supports in a direction and to an extent dependent upon the resultant of the centrifugal forces and the tension of the spring. Thus, when the speed of the driven shaft 16 exceeds a predetermined maximum value, the weight and the arms will be moved outwardly away from the centre of rotation of the driven shaft by the predominating centrifugal force produced, whilst, when the speed of the driven shaft is less than the predetermined minimum value, the weight and the arms will be caused to move inwardly towards the centre of rotation. Upon a fixed member 37, which may be conveniently constituted by a part of the casing of the transmission unit, are provided a pair of radially displaced pins 38 and 39, the arrangement being such that, when the speed of the driven shaft 16 reaches the predetermined maximum value, the teeth of the wheel 31 will engage the pin 38 and thus cause the wheel 31, the gears 29 and 28 and the worm spindle 25 to be displaced angularly by predetermined amounts. Also, when the speed of the driven shaft reaches the predetermined minimum value, the teeth of the wheel 31 will engage the pin 39 and thus cause angular displacements of the wheel 31, the gears 29 and 28 and the worm spindle 25 in the opposite direction. The thread of the worm 24 is such that, when the teeth of the wheel 31 engage the outer pin 38, the cams are displaced relatively to one another in such a manner that the maximum torque setting or the torque delivered to or available at the driven shaft is reduced. On the other hand, when the teeth of the wheel 31 engage the inner pin 39, the cams are displaced in the opposite direction so that they more nearly coincide and the maximum torque setting or the torque delivered to the driven shaft is increased.

Upon the pivoted ends of the arms 32 is provided a shorter arm or projection 40, and fixed to the cam 12 are two angularly displaced pins 41 and 42. In the arrangement herein described, the cam 12 may be moved in a counter-clockwise direction when the torque required to drive the shaft 16 is being reduced and the pin 42 is so arranged that, when the cam 12 has reached the limiting position for providing a substantially direct drive, the pin will engage the projection 40 and cause the arms 32 to be moved about their pivots in a counter-clockwise direction, i. e. in the opposite direction to that produced by the centrifugal forces on the weight 34, so that the wheel 31 is moved to such a position that it will no longer be acted upon by the outer pin 38. This position will be maintained until the shaft 16 again requires a larger torque when the speed of the driven shaft will be decreased and, consequently, the tension of the spring 35 will exceed the centrifugal forces on the weight 34 and the toothed wheel 31 will engage the inner pin 39 as above described and thereby cause a displacement of the cam 12 in a clockwise direction to increase the torque applied. Also, in the limiting maximum torque setting position, the pin 41 will engage the projection 40 and cause a displacement of the arms 32 so that the wheel 31 is moved to a position at which it is no longer acted upon by the inner pin 39.

Fig. 5 shows one convenient form of a manually operable means which may be employed for adjusting the maximum torque settings of the cams during the operation of the transmission mechanism. In this arrangement, the outer end of the worm spindle 25 is provided with a worm wheel 45 adapted to co-operate with a worm 46 mounted upon a shaft 47 carried by a casing 48 which forms a housing for the worm spindle 25 and which is suitably secured to the side of the central hub 15. To the free or a projecting end of the shaft 47 is secured a toothed wheel 50 arranged to co-operate with a longitudinally displaceable sleeve 51 mounted upon the driven shaft 16. The said sleeve is provided on its periphery with a series of circumferential grooves forming a series of parallel teeth 52 arranged in planes at right angles to the axis of the shaft 16, which teeth are adapted to engage with those formed upon the wheel 50. Also, adjacent to its outer end the sleeve is formed with a circumferential groove 53 to receive the rounded end of an arm 54 pivotally mounted at 55 upon a bracket 56 provided upon the casing 57, the arrangement being such that the lower end of the arm 54 can be caused by manually operable means to move substantially parallel with the axis of the shaft 16 to effect a displacement of the sleeve 51. By this arrangement, the sleeve may be displaced and the worm spindle 25 rotated to cause an adjustment of the relative positions of the cam members during the operation of the mechanism.

It is to be understood that the invention is not restricted to the details of construction herein described and illustrated but that various changes or modifications may be made without departing from the invention as defined by the appended claims.

Having thus described my invention what I claim as new therein and desire to secure by Letters Patent is:—

1. A power transmission mechanism comprising a driving member, a member to be driven, a plurality of cam members carried by one of the members and a plurality of loaded arms carried by the other member and adapted to coact with raised portions provided on the cam members in affording a driving connection between the driving and the driven members, the arrangement being such that, when the load is light, the driving member and the driven member will rotate at substantially the same speed with substantially no relative movement between the cam members and the arms whilst, when the load increases, relative movement occurs between the cam members and the arms in such a manner that a succession of forwardly directed impulses are imparted to the driven member and the torque available thereat is increased and also such that the cam members can be displaced angularly relatively to one another so as to vary their maximum torque settings.

2. A power transmission mechanism comprising the combination of a driving member, a driven member, a plurality of cams coupled to one of the members, a plurality of loaded elements moving with the other member so as to coact with the cams in affording a driving connection between the driving and the driven members and a spring loaded centrifugal device subject to the speed fluctuations of the driven member and adapted to cause an element carried thereby to coact with one of a pair of stationary stops whenever the speed reaches a limiting value, the said element being interconnected with means for adjusting the maximum torque setting of the mechanism.

3. A power transmission mechanism comprising the combination of a driving member, a driven member, a plurality of cams coupled to one of the members, a plurality of loaded elements moving with the other member so as to coact with the cams in affording a driving connection between the driving and the driven members, gear teeth upon certain of the cams and means responsive to the speed fluctuations of the driven member for causing the displacement of an element engaging said gear teeth to move the cams relatively to one another.

4. A power transmission mechanism comprising the combination of a driving member, a driven member, a plurality of cams coupled to one of the members, a plurality of loaded elements moving with the other member so as to coact with the cams in affording a driving connection between the driving and the driven members, a centrifugal device subject to the speed fluctuations of the driven member and adapted to cause an element carried thereby to coact with one of a pair of stationary stops whenever the speed reaches a limiting value, the element being inter-connected with means for relatively moving said cams, and further stops carried by a cam member and adapted to adjust the position of the element carried by the centrifugal device when the cam member reaches a limiting position.

CECIL CHARLES MORLEY.